United States Patent
Hötzel et al.

(10) Patent No.: US 11,104,201 B2
(45) Date of Patent: Aug. 31, 2021

(54) MULTI-ZONE AIR CONDITIONING SYSTEM FOR VEHICLES

(71) Applicant: Hanon Systems, Daejeon (DE)

(72) Inventors: Martin Hötzel, Ratingen (DE); Gerald Richter, Aachen (DE); Tobias Haas, Cologne (DE); Martin Schulze, Kerpen (DE)

(73) Assignee: HANON SYSTEMS, Daejeon (KR)

( * ) Notice: Subject to any disclaimer, the term of this patent is extended or adjusted under 35 U.S.C. 154(b) by 133 days.

(21) Appl. No.: 16/181,806

(22) Filed: Nov. 6, 2018

(65) Prior Publication Data

US 2019/0160909 A1 May 30, 2019

(30) Foreign Application Priority Data

Nov. 24, 2017 (DE) .......................... 102017127795.1
Oct. 8, 2018 (DE) .......................... 102018124748.6

(51) Int. Cl.
*B60H 1/00* (2006.01)
*B60H 1/22* (2006.01)

(52) U.S. Cl.
CPC ..... *B60H 1/00371* (2013.01); *B60H 1/00064* (2013.01); *B60H 1/00278* (2013.01);
(Continued)

(58) Field of Classification Search
CPC .............. B60H 1/00371; B60H 1/2226; B60H 1/00064; B60H 1/2225; B60H 1/00278;
(Continued)

(56) References Cited

U.S. PATENT DOCUMENTS 2,147,906 A * 2/1939 Lintern .............. B60H 1/00371
237/12.3 B
2,200,992 A * 5/1940 Lintern .............. B60H 1/00371
454/138
(Continued)

FOREIGN PATENT DOCUMENTS

AT 259618 B 1/1968
DE 102012108891 A1 3/2014
(Continued)

OTHER PUBLICATIONS

Non-Patent-Literature (NPL)—R744 (Year: 2016).*
(Continued)

*Primary Examiner* — Jianying C Atkisson
*Assistant Examiner* — Jose O Class-Quinones
(74) *Attorney, Agent, or Firm* — McLean IP Global; Jason Y. Pahng

(57) ABSTRACT

The invention relates to a multi-zone air conditioning system for vehicles (1) with several air conditioning zones (2), in particular for buses, characterized thereby that an air temperature control unit (3) is implemented to generate simultaneously warm air and cold air, wherein the cold air across a cold air duct (5) and the warm air across a warm air duct (6) extend separated from one another as a double conduit over the length of the vehicle (1) and that decentralized air mixing units (4) with at least one air outlet (20) are disposed along the double conduit and that the air outlets (20) are assigned to the air conditioning zones (2) of the vehicle (1).

14 Claims, 4 Drawing Sheets

Figure 1:
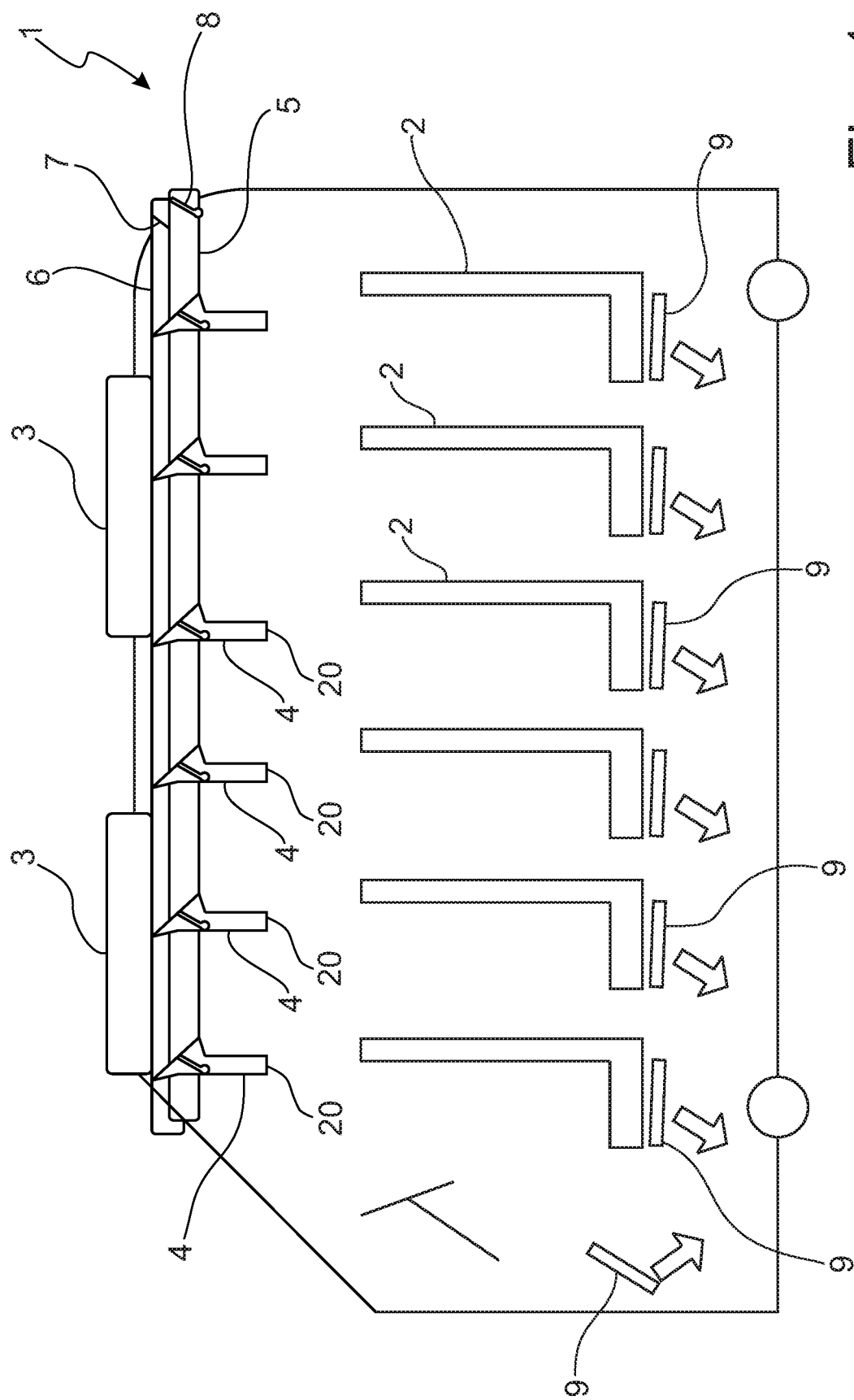

(52) U.S. Cl.
CPC ......... *B60H 1/2225* (2013.01); *B60H 1/2226* (2019.05); *B60H 1/00207* (2013.01); *B60H 2001/00235* (2013.01); *B60H 2001/2293* (2013.01)

(58) Field of Classification Search
CPC ........ B60H 1/00207; B60H 2001/2293; B60H 2001/00235; B60H 1/00878; F24F 3/052; F24F 3/0522
See application file for complete search history.

(56) References Cited

U.S. PATENT DOCUMENTS

| | | | | |
|---|---|---|---|---|
| 2,383,423 | A * | 8/1945 | Steins | B60H 1/00371 454/99 |
| 2,440,052 | A * | 4/1948 | Lingen | F24F 3/0522 236/9 A |
| 2,468,626 | A * | 4/1949 | Graham | F24F 3/001 165/240 |
| 2,620,983 | A * | 12/1952 | Lyman | F24F 3/0522 236/13 |
| 2,729,394 | A * | 1/1956 | Peterson | F24F 3/0522 236/13 |
| 2,747,842 | A * | 5/1956 | Shataloff | F24F 3/0522 165/216 |
| 2,755,072 | A * | 7/1956 | Kreuttner | F24F 3/0522 165/59 |
| 2,793,812 | A * | 5/1957 | Mcdonald | F24F 3/0522 236/13 |
| 2,984,459 | A * | 5/1961 | Waterfill | F24F 3/02 165/216 |
| 3,807,490 | A * | 4/1974 | Engel | B61D 27/0018 165/202 |
| 3,862,549 | A * | 1/1975 | Fernandes | B60H 1/00371 62/419 |
| 4,537,245 | A * | 8/1985 | Nishimura | B60H 1/00842 165/203 |
| 4,727,766 | A * | 3/1988 | Cummings | B60H 1/0065 137/353 |
| 4,858,518 | A * | 8/1989 | Yamaguchi | B60H 1/0065 454/126 |
| 4,870,833 | A * | 10/1989 | Matsuda | B60H 1/00428 62/134 |
| 5,076,346 | A * | 12/1991 | Otsuka | F24F 3/044 165/217 |
| 5,924,332 | A * | 7/1999 | Ozeki | B60H 1/0065 74/502.4 |
| 5,927,398 | A * | 7/1999 | Maciulewicz | F24F 11/30 165/209 |
| 6,261,174 | B1 * | 7/2001 | Kuehn | F24F 13/10 454/290 |
| 6,415,620 | B1 * | 7/2002 | Ferdows | B60H 1/00371 62/244 |
| 7,051,544 | B2 * | 5/2006 | Hille | B60H 1/00371 62/244 |
| 7,726,582 | B2 * | 6/2010 | Federspiel | G05D 23/1931 236/49.3 |
| 8,506,367 | B2 * | 8/2013 | Cermak | B60H 1/00371 454/152 |
| 2001/0029162 | A1* | 10/2001 | Yoshinori | B60H 1/247 454/137 |
| 2002/0000314 | A1* | 1/2002 | Danieau | B60H 1/00021 165/203 |
| 2004/0031596 | A1* | 2/2004 | Nishida | F25B 40/00 165/140 |
| 2007/0102145 | A1* | 5/2007 | Magnetto | F25B 17/12 165/104.12 |
| 2007/0277539 | A1* | 12/2007 | Kim, II | A47F 3/0482 62/153 |
| 2007/0295017 | A1* | 12/2007 | Pannell | B60H 1/00428 62/236 |
| 2009/0249807 | A1* | 10/2009 | Nemesh | B60H 1/00278 62/117 |
| 2011/0107869 | A1* | 5/2011 | Kim | B60H 1/0065 74/507 |
| 2014/0075973 | A1* | 3/2014 | Graaf | B60H 1/00057 62/115 |
| 2014/0075974 | A1* | 3/2014 | Klein | B60H 1/00057 62/119 |
| 2014/0075975 | A1* | 3/2014 | Graaf | B60H 1/00007 62/119 |
| 2014/0096945 | A1* | 4/2014 | Ghosh | B60H 1/247 165/204 |
| 2014/0209278 | A1* | 7/2014 | Goenka | B60H 1/005 165/104.13 |
| 2014/0335773 | A1* | 11/2014 | Takahashi | F24F 13/06 454/108 |
| 2015/0283876 | A1* | 10/2015 | Froehling | B60H 1/00057 165/121 |
| 2016/0137025 | A1* | 5/2016 | Lee | B60H 1/00371 62/244 |
| 2017/0100986 | A1* | 4/2017 | Shin | B60H 1/00057 |
| 2017/0129309 | A1* | 5/2017 | Lee | F25B 6/02 |
| 2017/0136848 | A1* | 5/2017 | Trutnovsky | B60H 1/00371 |
| 2017/0167776 | A1* | 6/2017 | Shin | B60H 1/00899 |
| 2017/0176046 | A1* | 6/2017 | Roth | B60H 1/3421 |
| 2017/0370611 | A1* | 12/2017 | Link | B60H 1/3421 |

FOREIGN PATENT DOCUMENTS

| | | |
|---|---|---|
| DE | 102015207645 A1 | 6/2016 |
| DE | 102015004308 A1 | 10/2016 |
| DE | 102015210624 A1 | 12/2016 |
| EP | 1604849 A1 | 12/2005 |
| JP | H10244827 A | 9/1998 |
| JP | 2001163033 A | 6/2001 |
| JP | 2007131202 A | 5/2007 |
| KR | 20170113948 A | 10/2017 |

OTHER PUBLICATIONS

The Many Benefits of Adding Fresh Air.pdf (Year: 2006).*
DE Office Action dated Nov. 6, 2019 for DE patent application DE 10-1028-124-748.6.
KR Office Action dated Feb. 20, 2020 for KR patent application KR 10-2018-0142557.

* cited by examiner

Connections for the supply of outside air and inside air

MULTI-ZONE AIR CONDITIONING SYSTEM FOR VEHICLES

This application claims priority from German Patent Application Nos. 102017127795.1 filed on Nov. 24, 2017 and 102018124748.6 filed on Oct. 8, 2018, which is hereby incorporated in reference in their entireties.

The invention relates to a multi-zone air conditioning system for vehicles whose passenger compartments comprise several air conditioning zones that are to be provided with optionally different air temperatures and air volume flows.

The field of application of the invention comprises in particular air conditioning systems for buses in which a large number of seats are to be air conditioned differently according to the individual preferences or needs of the passengers.

The invention is in particular applied in electric vehicles as well as in hybrid vehicles, driven by a combination of electric motor and internal combustion engine, as well as also in fuel cell-powered vehicles and highly efficiently-driven internal combustion engine vehicles with several air conditioning zones. With respect to air conditioning and heating of the passenger compartment in said vehicles there exists the problem that the listed vehicle types do not produce enough engine exhaust heat to adequately heat the passenger compartment and meet the thermal requirements of passengers in the winter.

In prior art this problem is partially solved thereby that electric Positive Temperature Coefficient (PTC) heaters are employed as additional heaters in combination with an air conditioning system, wherein the air flowing through the air conditioning system into the passenger compartment can only be cooled. Especially in vehicles with a large number of air conditioning zones, such as is the case, for example, in buses, a higher energy requirement must be met in order to fulfill the demands of the vehicle occupants. The energy requirement for air conditioning, and, in particular, also for heating the entire interior air volume of buses, for example, is so high that for reasons of capacity an additional roof-mounted system for the air conditioning unit must frequently be installed in order to meet the demands made by the occupants for their air-conditioning comfort.

A further known feasibility in prior art for providing generic vehicles with sufficient heat consists in equipping the air conditioning systems with a heat pump function. However, to do so requires markedly more installation space in comparison to electric heating.

It is also known that most often the heating and cooling capacity is sufficient for the first seating rows but does not provide comfortably-tempered air for all passengers.

The heat pump systems for vehicles have common characteristics with respect to their mode of function.

During cooling operation the heat required for evaporating the refrigerant is extracted from the air flowing into the passenger compartment in the evaporator of the refrigerant circulation and the inflowing air is thereby cooled. In the condenser/gas cooler of the refrigerant circulation the absorbed heat is dissipated at a higher temperature level to the environment.

During heating operation the heat necessary for evaporating the refrigerant is extracted from a waste heat source, for example from the environment. In the condenser/gas cooler of the interior space the heat is dissipated at a high temperature level via the inflowing air to the vehicle cabin. In heat pump systems the ambient air is herein utilized as one of the main heat sources. The refrigerant is evaporated by absorbing heat from the ambient air either directly in a refrigerant-air heat exchanger or indirectly in a refrigerant-coolant heat exchanger.

Of disadvantage in the above described approaches in prior art to finding solutions is that the air for the temperature control and cooling of the overall vehicle cabin, that most frequently includes relatively large volumes, is most often conditioned in the front portion of the vehicle. From here the entire interior volume of the vehicle must subsequently be supplied with the conditioned air. The central conditioning of the air and its decentralized distribution consumes much energy and, as a rule, the systems lack the necessary dynamics. The delay between the request of a specific air temperature and the perceptible response thereto is frequently considered to be unpleasant.

The invention addresses the problem of specifying a multi-zone air conditioning system for vehicles that enables the efficient provision of conditioned air without significant delay and at a number of zones to be air conditioned. The aim, in particular, is that different requirements with respect to air temperature and magnitude of the air volume flow in the various zones of the multi-zone air conditioning system are also met.

This problem is resolved through a subject matter with the characteristics according to patent claim 1. Further developments are specified in the dependent patent claims.

The problem of the invention is resolved in particular through a multi-zone air conditioning system for vehicles that have several air conditioning zones, such as buses, which is characterized thereby that an air temperature unit is realized such that it generates simultaneously warm air and cold air. The cold air is continuously transported over the length of the vehicle across a cold air duct and the warm air across a warm air duct, the two being separated from one another forming a double-strand conduit. Along the double conduit of the cold air duct and of the warm air duct decentralized air mixing units are provided which comprise at least one air outlet and with which, depending on the control or regulation of the air mixing units, from the warm air and from the cold air, the condition of the air is produced that is desired or specified in the air conditioning zone. An air outlet of an air mixing unit is locally assigned to an air conditioning zone of the vehicle such that from each air outlet of an air mixing unit an air conditioning zone is provided with air according to the parameters set in the air mixing unit.

The invention is advantageously realized with an air temperature control unit that comprises a relatively simply-structured refrigerant circulation with compressor, condenser, expansion element and evaporator. The condenser is herein disposed in the warm air duct and the evaporator in the cold air duct. The air to be conditioned is conveyed by a blower into the cold air duct and into the warm air duct through the evaporator and through the condenser, respectively.

It is especially preferred to provide separate blowers for the generation of a warm air flow and the generation of a cold air flow in the air temperature control unit such that they can be controlled and regulated separately from one another. The warm air flow is consequently generated by a blower that conveys air through the condenser into the warm air duct and the cold air flow is, analogously, conveyed through a separate blower that conveys air through the evaporator into the cold air duct. This has the advantage that depending on the environmental conditions, for example during the cold season, an intense cold air flow can be omitted and, analogously, during the warm season the warm air flow can be reduced saving energy.

The blower advantageously comprises connections for the supply of outdoor and/or indoor air, wherein the regulation of the ratio of the air supply one to the other is realized in the conventional manner through setting elements, such as louvers, shutters, valves, flaps or the like.

The cold air duct and the warm air duct are advantageously disposed laterally or at the ceiling of the vehicle.

The air temperature control unit is preferably disposed on or at the roof of the vehicle.

Especially in the case of electric vehicles a battery cooling unit is advantageously integrated into the refrigerant circulation parallel to the evaporator of the air temperature control unit. In the broader sense, the battery cooling unit is also utilized for integrating electronic components or circuitry as well as additional electric waste heat sources within the vehicle into the thermal management system of the vehicle and, for example, be used for heating the vehicle across the heat pump function of the system in the event of heat requests directed to the multi-zone air conditioning system.

Under certain circumstances it is advantageous to provide several air temperature control units along the double conduit and to feed cold and warm air into the appropriate ducts at several sites.

A preferred application of the invention comprises that the air conditioning zones are directly assigned to seats in the vehicles, wherein the seats advantageously include sensors for detecting seat occupancy. In the case of an automatic control and regulation system of the multi-zone air conditioning system the occupancy of the seats, and therewith the supply of the assigned air conditioning zone, can thereby be automatically incorporated into the control system.

In addition to the multi-zone air conditioning system characterized above, within an air conditioning zone, and especially in the footwell area of such a zone, an infrared heater is preferably disposed such that during cooler temperatures it is not necessary to heat the entire vehicle cabin, or the entire air conditioning zone, to a high temperature level but that, specifically in the footwell, in view of the comfort requirements of the vehicle occupants, an increased temperature is only obtained locally.

The air mixing unit comprises connections for the cold air duct and the warm air duct and is preferably disposed between cold air duct and warm air duct. The air mixing unit includes a temperature louver for setting the ratio of warm air to cold air and, downstream in the direction of the air flow, a volume louver is disposed for setting the air volume flow at the air outlet of the air mixing unit.

The air mixing unit is especially preferably developed such that it is automatically or remotely controlled with the temperature louver and the volume louver via an air conditioning control device of the vehicle. The louvers are herein preferably electrically driven.

Alternatively to the above described implementation variant, the air mixing unit is developed such that it is manually operable, wherein an operating element is provided, for example in form of a knob 21. By its rotation the knob 21 controls the temperature of the air volume and by an axial displacement of the knob 21 the air quantity of the air volume flow can be regulated.

Depending on its implementation, an air mixing unit comprises advantageously several air outlets which serve for conditioning one or several air conditioning zones.

The refrigerant circulation of the air temperature control unit is preferably operated with R744 as the refrigerant, wherein the condenser is preferably developed as a combined refrigerant store and drier.

In summary, the concept of the invention is seen therein that each of the air temperature control units continuously supplies at least one warm and one cold air duct with appropriately conditioned air. The warm air and the cold air duct extend from the front to the back of the vehicle. The two ducts are implemented as a double conduit. The air flows can be mixed individually by means of distributed individual air nozzles at the position of the particular air conditioning zone or of the passengers and their air quantities can be adjusted. The air outlets in the form of air nozzles are herein part of the air mixing unit which decentralized mixes a portion of the cold air flow and a portion of the warm air flow for one or several air conditioning zones. The nozzles for the air outlet are located in the roof lining or ceiling above each individual passenger or laterally thereto.

Within the control of the multi-zone air conditioning system, for the preconditoning of the seats or in the case of occupied seats, the air nozzles are opened and the optional infrared radiator is added when needed, This is feasible in the implementation variants in which sensors for detecting the occupancy of the seats are integrated into the system. Due to the modular structure, one, two or several air temperature control units can be configured such that they are interconnected. The number of air mixing units and of air outlets is also freely scalable from an individual driver in a delivery vehicle up to multi-seat vehicles with several seat rows such as buses.

The air temperature control units include a refrigerant compressor, a condenser with high-pressure refrigerant store and drier, as well as a subcooling section, an expansion element and a refrigerant evaporator. The air temperature control units can be located in the front end, on the roof and/or in the roof lining. The refrigerant compressor can optionally also be located outside of these air temperature control units in order to reduce noises and vibrations in the inside.

The system is advantageously optionally expanded by including a further cooling function or waste heat utilization.

The air temperature control units supply a condenser path, the warm air path, and an evaporator path, the cold air path. Each path preferably includes its own blower.

The advantages of the invention comprise that the multi-zone air conditioning system allows cooling of the interior as well as dehumidification and heating of the passenger compartment while being energy efficient. The battery and other electric powertrain components can be cooled passively or actively by the refrigerant circulation of the air temperature control unit. The degree of utilization of the waste heat, and consequently the efficiency of the heating system, is very high and the systems can be utilized flexibly.

The total energy requirement is reduced through the following effects:

Reduction of the electrical consumption through heat pump utilization for efficiency enhancement of the heating system through the air temperature control units and reduction of the necessary heating capacity through distributed comfort systems. It is no longer necessary to air condition the entire interior space since it is possible to cool or heat specifically and selectively only on-site depending on need and requirement.

The operation of the multi-zone air conditioning system to reach and maintain the inside comfort is markedly more efficient in comparison to a pure PTC heating system. Consequently, in a purely electrically operated vehicle this results in both range gain and comfort gain. In the case of a hybrid drive the emission of carbon dioxide per kilometer is reduced.

The advantages of the invention reside therein that, in spite of air-side interconnections, sufficient cooling capacity is available. It is especially advantageous that each passenger can individually control the air volume flow and the temperature of the air. It is also advantageous that the refrigerant-side tubing of the multi-zone air conditioning system can take place very simply and centralized such that the risk of refrigerant leakage is also reduced.

Figure 2:
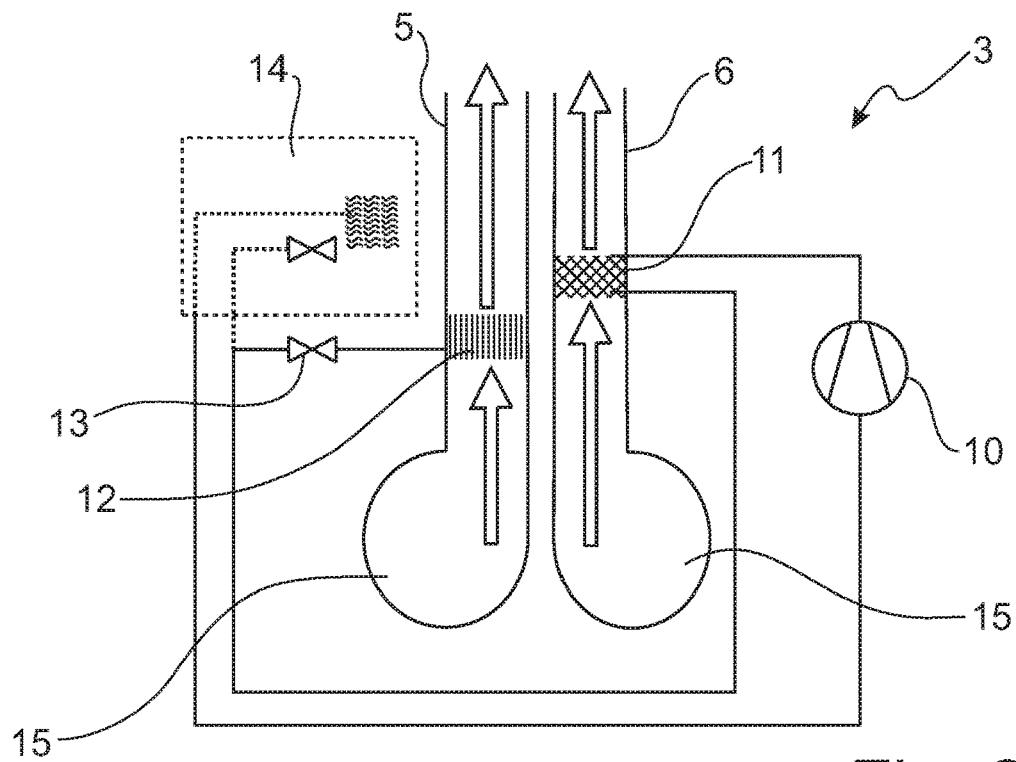
Figure 3:
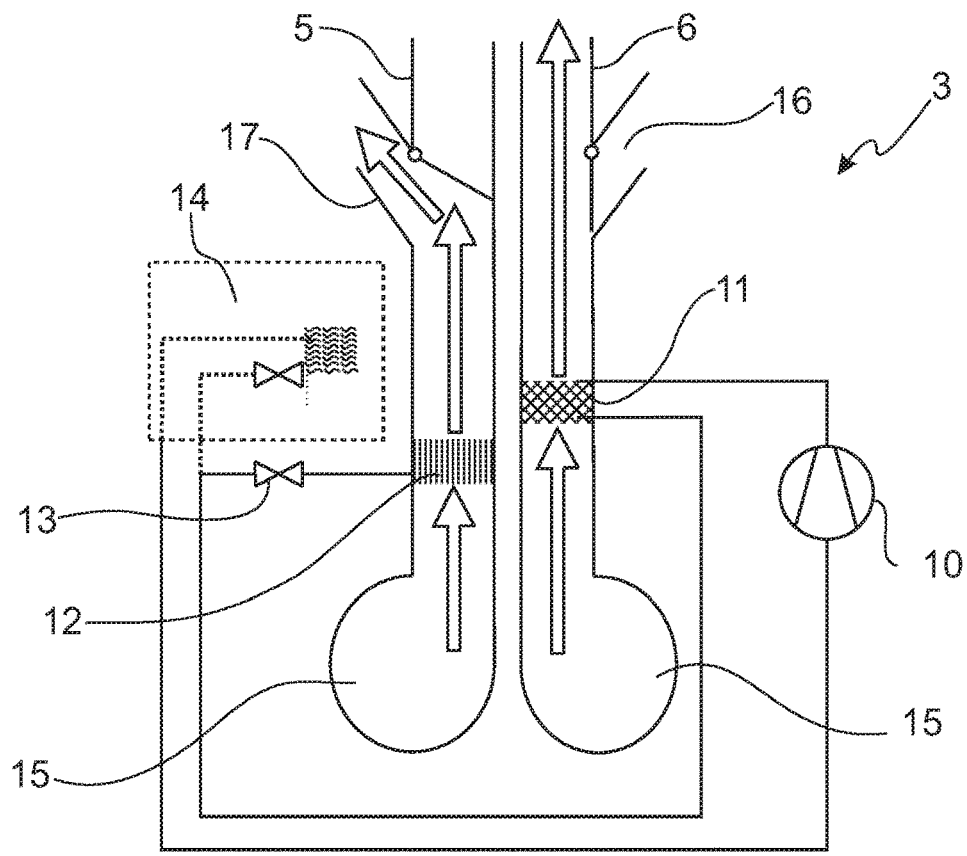
Figure 4:
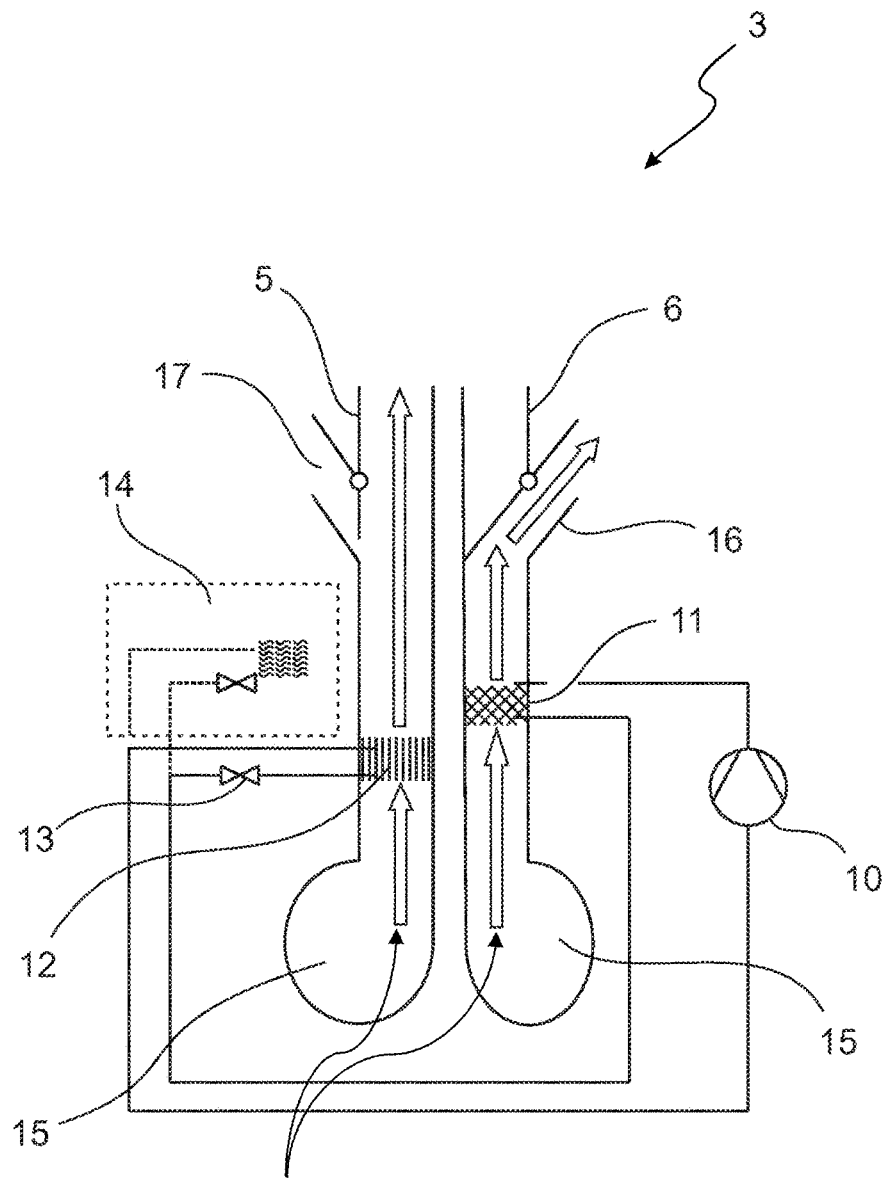
Figure 5:
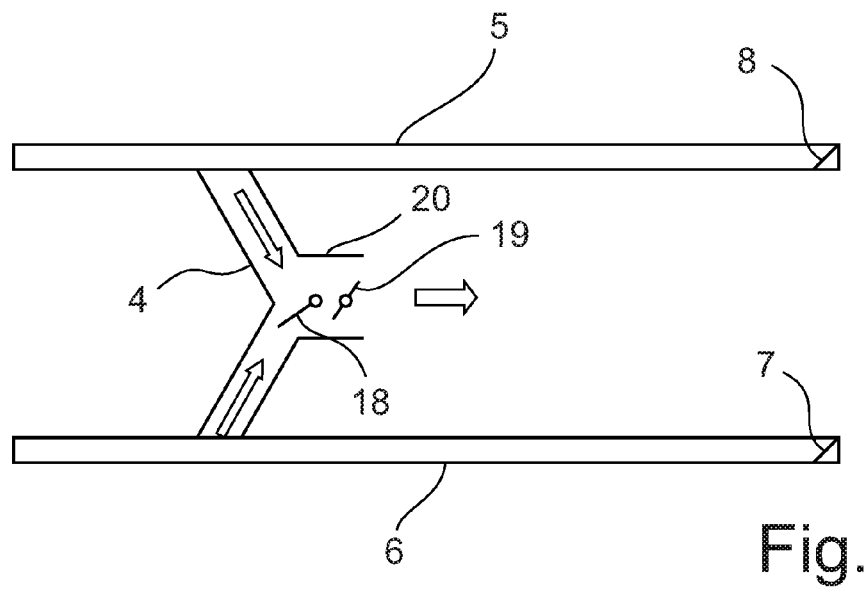

Further details, characteristics and advantages of implementations of the invention are evident in the following description of embodiment examples with reference to the associated drawing. Therein depict:

FIG. 1: bus with multi-zone air conditioning system,

FIG. 2: schematic diagram air temperature control unit as a basic principle,

FIG. 3: schematic diagram air temperature control unit in heating operation,

FIG. 4 schematic diagram air temperature control unit in cooling operation,

FIG. 5 air mixing unit with an air outlet, and

Figure 6:
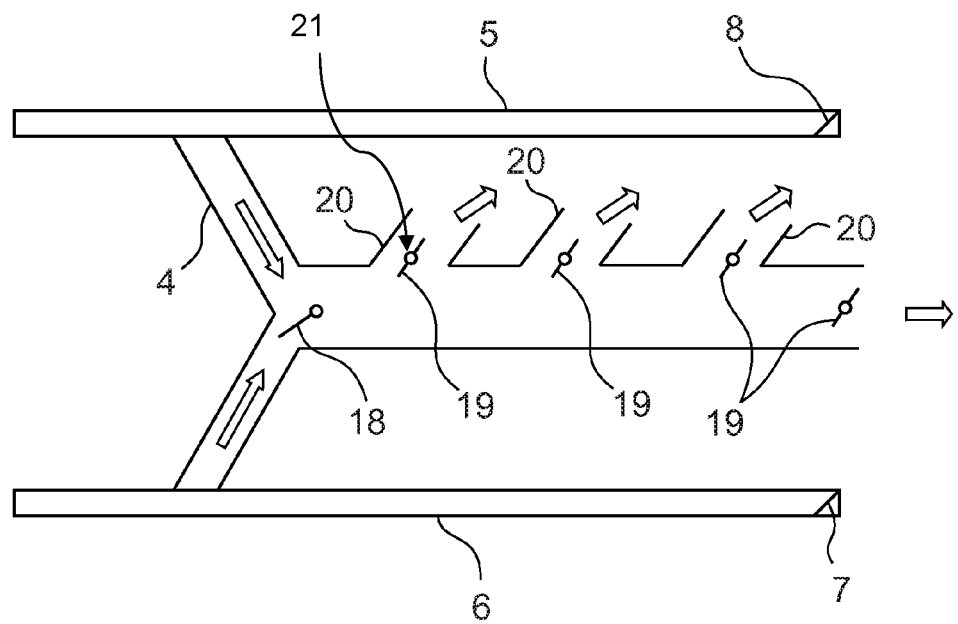

FIG. 6 air mixing unit with several air outlets.

FIG. 1 depicts in principle a vehicle 1 as a bus with a number of air conditioning zones 2 that are assigned to seats. The air conditioning zones 2 are provided with conditioned air through air outlets 20 of the air mixing units 4. In the depicted embodiment example the conditioned air is supplied by two air temperature control units 3 into a double conduit of a cold air duct 5 and a warm air duct 6. The cold air duct 5 comprises at its end an outgoing air louver 8 and the warm air duct 6 is closed at its end by an outgoing air louver 7.

Corresponding to the number of seats, air conditioning zones 2 are formed in the vehicle 1, which are supplied with the conditioned air through the air outlets 20 located in the roof lining of the vehicle 1. The air conditioning zones 2 include in the lower region, thus in the footwell of the vehicle 1, additional footwell heaters 9, for example in the form of infrared radiation heaters, which heat specifically the footwell.

In FIG. 2 is depicted an air temperature control unit 3. The air temperature control unit 3 comprises a refrigerant circulation comprised of the basic components compressor 10 as well as condenser 11, expansion element 13 and evaporator 12. The components of the refrigerant circulation are, as is conventional, tubed in the circulation, and during operation of the circulation, heat is generated in the condenser 11 with which an air volume flow from a blower 15 is heated and fed into the warm air duct 6. Simultaneously, and in parallel thereto, the air to be cooled is transported via a blower 15 through the evaporator 12 into the cold air duct 5. The evaporation of the refrigerant in the evaporator 12 of the refrigerant circulation leads to the cooling of this air flow. The air temperature control unit 3 itself represents a space-saving and compactly structured cold and heat pump module which can continuously generate a cold air as well as also a warm air flow. A battery cooling unit 14 in the depicted embodiment expands the refrigerant circulation in order to integrate for example the drive battery or also additional electronic components and waste heat generators into the circulation. The elements to be cooled are herein cooled and simultaneously heat is output for the regions to be heated.

The condenser 11 is implemented as a combination component with a store and a drier.

FIG. 3 depicts an air temperature control unit 3 similar to FIG. 2 which, in view of the cold air duct 5, is expanded by a cold air outlet 17 with associated louver. Via the depicted cold air outlet 17 the air temperature control unit 3 in heating mode can discharge the cold air into the environment. The evaporator 12 of the refrigerant circulation consequently provides essentially the heat for the heat pump function of the condenser 11. In this operating mode preferably outside air is cooled in the evaporator 12 and consequently heat is extracted from this outside air, whereby the cooled outside air immediately after the evaporator 12 is discharged into the environment via the cold air outlet 17.

FIG. 4 depicts an air temperature control unit 3 analogous to FIGS. 2 and 3, wherein here the cooling mode is shown. In cooling mode the warm air flow leaves the system across the warm air outlet 16 with appropriate louvers immediately after the heat uptake in condenser 11. This mode, as stated, is realized largely in cooling mode and the heat of condensation is discharged to the environment in chiller operation.

FIG. 5 depicts the double conduit of the cold air duct 5 and of the warm air duct 6. The two ducts 5, 6 are connected through an air mixing unit 4. The air mixing unit 4 connects the warm air duct 6 and the cold air duct 5 and, as indicated schematically by an arrow, taps the appropriately conditioned air flows from the ducts.

By means of the temperature louver 18 the ratio of cold air to warm air, and therewith the corresponding temperature of the resulting air flow, is established. With the volume louver 19, which is downstream of the temperature louver 18 in the direction of air flow, lastly the volume flow of the exiting air at the air outlet 20 is set either manually by the occupant directly or under remote control.

Alternatively, the control of the air temperature, the air humidity as well as the air volume flow is realized by way of the air conditioning control system of vehicle 1.

FIG. 6 depicts an air mixing unit 4 which, in distinction to the air mixing unit 4 according to FIG. 5, after the control of the temperature through the temperature louver 18, comprises several air outlets 20, which are each equipped with a volume louver 19. In this embodiment the air for the air conditioning zone 2 is controlled identically for several zones.

LIST OF REFERENCE NUMBERS

1 Vehicle
2 Seat, air conditioning zone
3 Air temperature control unit
4 Air mixing unit
5 Cold air duct
6 Warm air duct
7 Outgoing air louver
8 Outgoing air louver
9 Footwell heater
10 Compressor
11 Condenser with store and drier
12 Evaporator
13 Expansion element
14 Battery cooling unit
15 Blower
16 Warm air outlet with associated louvers
17 Cold air outlet with associated louvers
18 Temperature louver
19 Volume louver
20 Air outlet

What is claimed is:

1. A multi-zone air conditioning system for vehicles with several air conditioning zones, comprising an air temperature control unit to simultaneously generate warm air and cold air, wherein the cold air flows across a cold air duct and the warm air flows across a warm air duct, and wherein the cold air duct and the warm air duct each extend over the length of the vehicle separated from one another forming a double conduit, and decentralized air mixing units disposed along the double conduit, each air mixing unit including at least one air outlet, and the at least one air outlet of each air mixing unit is located on a respective zone of the air conditioning zones of the vehicle, wherein for the generation of a warm air flow and a cold air flow a blower each is disposed in the air temperature control unit such that each blower is controllable and regulatable separately one from the other.

2. A multi-zone air conditioning system for vehicles with several air conditioning zones, comprising an air temperature control unit to simultaneously generate warm air and cold air, wherein the cold air flows across a cold air duct and the warm air flows across a warm air duct, wherein the cold air duct and the warm air duct each extend over the length of the vehicle separated from one another forming a double conduit, and decentralized air mixing units disposed along the double conduit, each air mixing unit including at least one air outlet, and the at least one air outlet of each air mixing unit is located on a respective zone of the air conditioning zones of the vehicle, wherein any one of the air mixing units is developed such that it is manually operable, wherein a control element in the form of a knob is provided which via its rotation controls the temperature of the air volume flow and via its axial displacement controls the air quantity of the air volume flow.

3. A multi-zone air conditioning system for vehicles with several air conditioning zones, comprising an air temperature control unit to simultaneously generate warm air and cold air, wherein the cold air flows across a cold air duct and the warm air flows across a warm air duct, and wherein the cold air duct and the warm air duct each extend over the length of the vehicle separated from one another forming a double conduit, and decentralized air mixing units disposed along the double conduit, each air mixing unit including at least one air outlet, and the at least one air outlet of each air mixing unit is located on a respective zone of the air conditioning zones of the vehicle, wherein the air temperature control unit includes a blower comprising connections for the supply of outside air and inside air, with the regulation of the ratio one to the other of the air supply.

4. A multi-zone air conditioning system as in claim 3, wherein the air temperature control unit comprises a refrigerant circulation with compressor, condenser, expansion element and evaporator, wherein the condenser is disposed prior to the warm air duct and the evaporator is disposed prior to the cold air duct and air can be conveyed by the blower into the cold air duct and into the warm air duct through the evaporator and the condenser.

5. A multi-zone air conditioning system as in claim 4, wherein the refrigerant circulation of the air temperature control unit includes R744 as the refrigerant and that the condenser is implemented as a combined refrigerant store and drier.

6. A multi-zone air conditioning system as in claim 3, wherein the cold air duct and the warm air duct are disposed laterally or at a roof lining of the vehicle.

7. A multi-zone air conditioning system as in claim 3, wherein the air temperature control unit is disposed on or at the roof of the vehicle.

8. A multi-zone air conditioning system as in claim 3, wherein several air temperature control units are provided.

9. A multi-zone air conditioning system as in claim 3, wherein the air conditioning zones are assigned to seats and that the seats comprise sensors for detecting occupancy of the seats.

10. A multi-zone air conditioning system as in claim 3, wherein additionally an infrared heater is disposed in a footwell of any one of the air conditioning zones.

11. A multi-zone air conditioning system as in claim 3, wherein any one of the air mixing units comprises connections for the cold air duct and the warm air duct and is located between them and that on the air mixing unit a temperature louver is provided for setting the ratio of warm air to cold air and downstream thereof a volume louver is provided for setting the air volume flow at the at least one air outlet of the air mixing unit.

12. A multi-zone air conditioning system as in claim 3, wherein any one of the air mixing units comprises several air outlets.

13. A multi-zone air conditioning system as in claim 3, wherein for the generation of a warm air flow and a cold air flow a blower each is disposed in the air temperature control unit such that each blower is controllable and regulatable separately one from the other.

14. A multi-zone air conditioning system as in claim 3, wherein any one of the air mixing units is developed such that it is manually operable, wherein a control element in the form of a knob is provided which via its rotation controls the temperature of the air volume flow and via its axial displacement controls the air quantity of the air volume flow.

* * * * *